Aug. 28, 1962   C. SCHNELL   3,051,208
BLADE ASSEMBLY FOR COMMINUTING MACHINE
Filed Aug. 27, 1959

Inventor
Carl Schnell

3,051,208
BLADE ASSEMBLY FOR COMMINUTING MACHINE
Carl Schnell, Winterback, near Schorndorf, Wurttemberg, Germany, assignor of one-half to The Griffith Laboratories, Inc., Chicago, Ill., a corporation of Illinois
Filed Aug. 27, 1959, Ser. No. 836,485
15 Claims. (Cl. 146—192)

The present invention relates to centrifugal comminuting machines, and in particular to a structure forming part of the cutting rotor.

Reference is made to my U.S. Patents Nos. 2,840,318 of June 24, 1958, and to 2,836,825 of May 27, 1958, and to No. 2,842,177 of July 8, 1958, in order to show the types of centrifugal machines to which the present invention pertains.

The above-mentioned patents show comminuting machines in which there is a supply chamber leading to a comminuting chamber, preferably enlarged from the supply chamber by at least a portion of a wall connecting the two chambers. The exit of the comminuting chamber is a perforate plate having a circular opening therein in which rotates a knife-holder driven by a shaft extending into a receiving chamber toward the exit side of the perforate plate. In the receiving chamber, the shaft has a hub rotatably secured to it from which hub extend wings rotatable in a narrow space between the perforate plate and an opposing parallel wall, thus forming a centrifugal ejection rotor to remove material from the receiving chamber. The knife-holder is clamped to the said hub by threaded means, associated with the end of the shaft. The knife-holder has at least one cutting arm projecting from it, and preferably two arms, each arm having a leading cutting edge, a trailing cutting edge which shears with the holes in the perforate plate, and a propelling face connecting said edges and sloped at about 45° to force material during rotation toward the perforate plate. Said arms are so located that at least the trailing edge lies rearwardly of a plane passing through the outer tip of the trailing edge and the axis of rotation. Preferably, the knife arm tapers outwardly and downwardly toward the perforate plate with the result that the distance between the leading and trailing cutting edges decreases toward the tip of the arm forming a cutting propeller. The trailing edge is preferably in the form of a forwardly directed knife-edge underlying a pressing surface generally parallel to the perforate plate and formed by a recess into the propelling face, or by other modification of the face connecting the two cutting edges.

By reason of mounting the knife-holder to the hub by threaded means, the knife-holder may be removed from the hub, thus removing the cutting arms from contact with the plate and releasing the plate so that it likewise may be removed from supporting shoulders on its exit side. Thus, on removing the knife-holder, the cutting edges may be sharpened, and also the plate may be changed to one of coarser or finer perforations according to the material to be comminuted in the machine. In order to remove the cutting arms and the plate and to assure positioning of the trailing cutting edge on the perforate plate, the shaft is axially adjustable. This is effected by adjusting the position of mounting means for the shaft. The adjustable mounting means is preferably located between the receiving chamber and a power connection to the shaft, which may be an electric motor into which said shaft may project as a motor shaft, or it may be a belt or chain drive, or a shaft-coupling.

When the material to be comminuted is discharged in a fluid condition, the receiving chamber is preferably sealed except for the exit side of the perforate plate and except for a discharge opening. Accordingly, the opening in the wall of the receiving chamber through which the shaft enters is sealed so that suction caused by the centrifugal ejection rotor does not draw in air around the shaft and exerts its full effect on the underside of the perforate plate. Likewise, when the material to be discharged is fluid the receiving chamber is preferably provided with a tangential discharge conduit through which the fluid material is discharged in the manner of a centrifugal pump, as shown and described in said Patents Nos. 2,836,825 and 2,842,177. When the material is coarser and the perforate plate has relatively large holes, and the comminuted material is not fluid, the receiving chamber is preferably provided with a wide-mouthed spout in the manner shown in Patent No. 2,840,318. A machine so constructed is suitable for comminuting fodder for animals and is used in the bakery industry for comminuting stale bread and like products. When the receiving chamber is provided with a tangential discharge conduit and the content is fluid, the holes in the plate are very fine and suitable for comminuting meat and meat formulations to ground meat and sausage emulsions, for example.

In particular, the two forms of the machine shown in Patent No. 2,840,318 have a clamping nut for the knife-holder which in one case extends to a height above the cutting arms with a flat top, and in another case with a flat top at a level substantially the same as the leading edges of the cutting arms. Since the machines of the type described operate at high speeds, such as 3000 to 3600 r.p.m., it has been found that some of the material to be comminuted becomes centered over the nut and fails to move from such location and to be comminuted, thus accumulating such material in continuous operation. The present invention provides means to overcome this disadvantage.

According to the invention, at least one planar blade is provided which extends radially from the axis of rotation, overlies the disk portion of the cutting rotor, and extends away from the perforate plate, and preferably into the supply chamber, to a point axially beyond the cutting arms. As a radial blade it moves material at the center centrifugally away from the center for movement into the path of the cutting arms. Preferably, the blade is diametric and has a sharpened outer edge, devoid of a flat area, presented to incoming material, thus to cut it, and to deflect it to both sides of the blade. Because of the high speed and resulting centrifugal effect, the blade has a contour which effectively narrows its radial propelling face outwardly in the radial direction, thus compensating for the increasing centrifugal force as the radial distance increases.

The radial extent of the blade is preferably limited so as not to extend beyond the periphery of the disk portion of the rotary cutter, which is the knife-holder described, thereby discharging the material moved by it into a region from which it is picked up by a projecting cutting arm.

The invention is shown in the accompanying drawings in which the parts illustrated are more or less diagrammatic representations or equivalents of the parts described in my said prior patents, the details of which are herein incorporated by the references to them, and designated by their more or less diagrammatic representations and characterizations.

Figure 1:
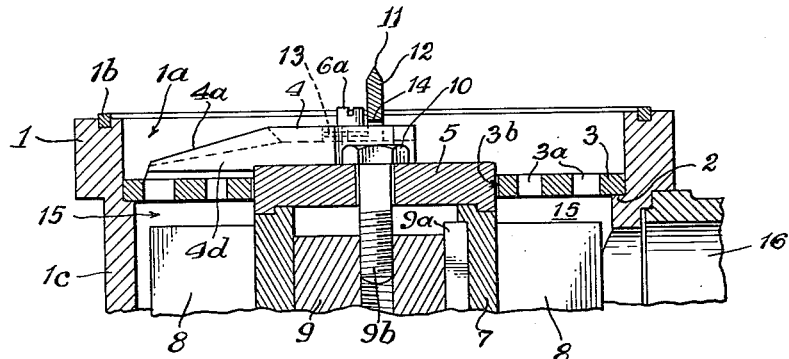
FIG. 1 represents a portion of a machine housing which holds the perforate plate and forms a peripheral wall of a comminuting chamber, and a peripheral wall of a receiving chamber having therein a centrifugal ejection rotor with a hub supporting a cutting rotor.

In the drawings the numeral 1 represents a portion of a machine housing forming a circular comminuting chamber 1ª. At the top of the housing is a packing ring 1ᵇ for sealing the space between housing 1 and a removal housing which forms the supply chamber, such as the section shown in my prior patents which has a circular neck portion enlarging in diameter, as by a conoidal sloping wall. Housing 1 has an inner circular shoulder 2 on which sets an exchangeable perforate plate 3 with an annular band of perforations 3ª and a central circular opening 3ᵇ.

A circular knife-holder 5 rotates in the opening 3ᵇ. The knife-holder is shown as carrying two cutting arms 4 of the type shown in said patents, with a leading cutting edge 4ª, a trailing cutting knife-edge 4b at a recess 4ᶜ in a propelling face 4ᵈ lying between said edges. The leading cutting edge 4ª continues as 4ᵈ overlying the knife-holding disk 5. Numerals 5ª represent areas at which the arms 4 are removably secured to the knife-holder 5, as by screw-means preferably from the underside of the knife-holder as shown in said patents.

Numeral 7 represents a hub in a receiving chamber at the exit side of plate 3, which hub has ejection or stripper wings 8. The knife-holder 5 is clamped to the hub 7 by threaded means associated with a driving shaft, the particular manner of association being unimportant. One way comprises a shaft 9 to which hub 7 is fixed, in part by key 9ª, and into which shaft is threaded a bolt 9ᵇ, with a flat hexagonal head 10.

Figure 3:
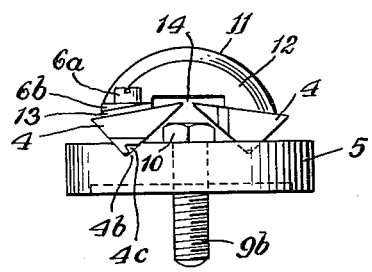
FIG. 3 is a side view of the structure shown in FIG. 2.

After the arms 4 are secured to the knife-holder 5 and the holder is secured by bolt-head 10, a radial blade 12 of the present invention is applied. The blade 12 is flat and positioned diametrically of the knife holder 5. It has spaced-apart ears 13 projecting at right-angles from opposite faces of the blade and at the bottom edge thereof. These ears are bolted to the arms 4 at the regions 6, by bolts with heads 6ª (FIG. 3) over tapered washers 6ᵇ to accommodate the sloping tops of arms 4. At the center of the blade 12 a cut-out recess 14 surrounds the bolt-head 10 with sufficient space to permit loosening bolt 9ᵇ.

The blade 12 has a sharp top central edge 11 forming a knife-edge and divider. Its most remote region from the perforate plate is at the axis of rotation, and from that region the edge 11 moves outwardly and downwardly toward the plate 3, as by its arcuate form resulting from a generally semi-circular contour of the blade.

Figure 2:
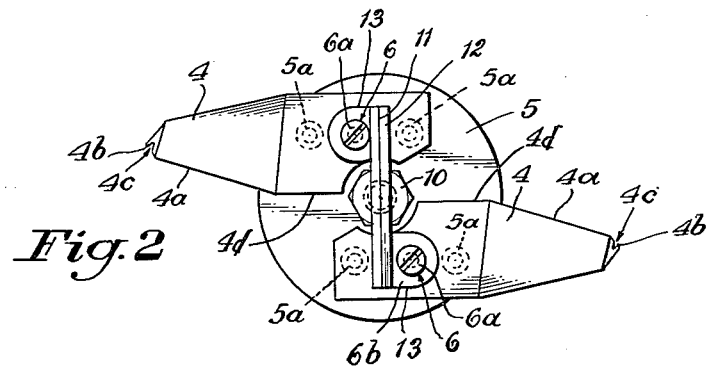
FIG. 2 is a plan view of the cutting rotor of FIG. 1.

As shown in FIG. 2, the paths of rotation of the blade 11 and of the knife edges 4ᵈ overlap.

The lower part 1ᶜ of housing 1 defines a receiving chamber 15 in which the ejection rotor operates to strip material from the plate 3 and discharge it through outlet 16, illustrated as a wide-mouthed spout for coarse material passing through the relatively large holes 3ª in the plate 3.

Other forms of radial blade for the purpose may be employed within the scope of the invention as set forth in the appended claims.

I claim:

1. In a centrifugal comminuting machine a rotary cutter comprising a circular disk portion rotatable about a central axis, an annular foraminous plate surrounding said disk, at least one cutting arm overlying and projecting from said disk and having an inner forwardly directed cutting edge spaced away from and overlying said disk and an outer forwardly directed cutting edge spaced away from and overlying said foraminous plate, for comminuting material during rotation of the cutter about said axis, and a blade overlying the disk and extending away from said disk and from said inner cutting edge in the axial direction and having a portion lying in said axis, said blade extending outwardly from said axis so that its path in rotation overlaps in the radial direction the path of said inner cutting edge, whereby said blade propels material which lies over said disk and closely adjacent the axis laterally to pass over the path of the inner cutting edge to overlie the foraminous plate and the path of the outer cutting edge.

2. A rotor according to claim 1 in which the blade has a sharp edge pointing in the direction away from the disk.

3. A rotor according to claim 1 in which the blade at the location of the axis has its edge most remote from the disk.

4. A rotor according to claim 1 in which the blade has its edge extending outwardly from the axis and toward the disk.

5. A rotor according to claim 1 in which the blade has an arcuate edge with its portion most remote from the disk located at the axis.

6. In a centrifugal comminuting machine a rotary cutter comprising a circular disk portion rotatable about a central axis, an annular foraminous plate surrounding said disk, at least one cutting arm overlying and projecting from said disk and having an inner forwardly directed cutting edge spaced away from and overlying said disk and an outer forwardly directed cutting edge spaced away from and overlying said foraminous plate, for comminuting material during rotation of the cutter about said axis, and a diametric blade overlying the disk and extending away from said disk and from said inner cutting edge in the axial direction and having a portion lying in said axis, said blade extending symmetrically outwardly from said axis so that its path of rotation overlaps in the radial direction the path of said inner cutting edges, whereby said blade propels material which lies over said disk and closely adjacent the axis laterally to pass over the path of the inner cutting edge to overlie the foraminous plate and the path of the outer cutting edge.

7. A rotor according to claim 6 in which the blade has a sharp edge pointing in the direction away from the disk.

8. A rotor according to claim 6 in which the blade at the location of the axis has its edge most remote from the disk.

9. A rotor according to claim 6 in which the blade has its edge extending outwardly from the axis and toward the disk in opposite directions along its diametrical extent.

10. A rotor according to claim 6 in which the blade has a generally semi-circular edge with its portion most remote from the disk located at the axis.

11. In a centrifugal comminuting machine a rotary cutter comprising a circular disk portion rotatable about a central axis, an annular foraminous plate surrounding said disk, two cutting arms overlying and projecting from said disk each having an inner forwardly directed cutting edge rotatable in a common path spaced away from and overlying said disk and each having an outer forwardly directed cutting edge rotatable in a common path spaced away from and overlying said foraminous plate, for comminuting material during rotation of the cutter about said axis, said arms being parallel and spaced apart on opposite sides of said axis, and a diametric blade overlying the disk and extending away from said disk and from said inner cutting edge in the axial direction and having a portion lying in said axis, said blade extending symmetrically outwardly from said axis so that its path of rotation overlaps in the radial direction the path of said inner cutting edge, whereby said blade propels material which lies over said disk and closely adjacent the axis laterally to pass over the path of the inner cutting edges to overlie the foraminous plate and the path of the outer cutting edges and extending in the axial direction away from said arms, said blade being at right angles to said arms, the path of the blade during rotation including the paths of a cutting portion of each cutting arm during its rotation.

12. A rotor according to claim 11 in which the blade has a sharp edge pointing in the direction away from the disk.

13. A rotor according to claim 11 in which the blade at the location of the axis has its edge most remote from the disk.

14. A rotor according to claim 11 in which the blade has its edge extending outwardly from the axis and toward the disk in opposite directions along its diametrical extent.

15. A rotor according to claim 11 in which the blade has a generally semi-circular edge with its portion most remote from the disk located at the axis.

References Cited in the file of this patent

UNITED STATES PATENTS

| | | |
|---|---|---|
| 527,769 | Chapman | Oct. 23, 1894 |
| 1,273,269 | Pugge | July 23, 1918 |
| 2,026,918 | Streckfuss | Jan. 7, 1936 |
| 2,840,318 | Schnell | June 24, 1958 |
| 2,873,779 | Eykamp | Feb. 17, 1959 |

FOREIGN PATENTS

| | | |
|---|---|---|
| 271,059 | Switzerland | Jan. 3, 1951 |
| 310,740 | Switzerland | Jan. 14, 1956 |